Dec. 7, 1954   W. W. HARTMAN   2,696,253
SPACING CONTROL FOR MULTIPLE BAND-TYPE CUTTING ELEMENTS
Filed Jan. 12, 1951   3 Sheets-Sheet 1
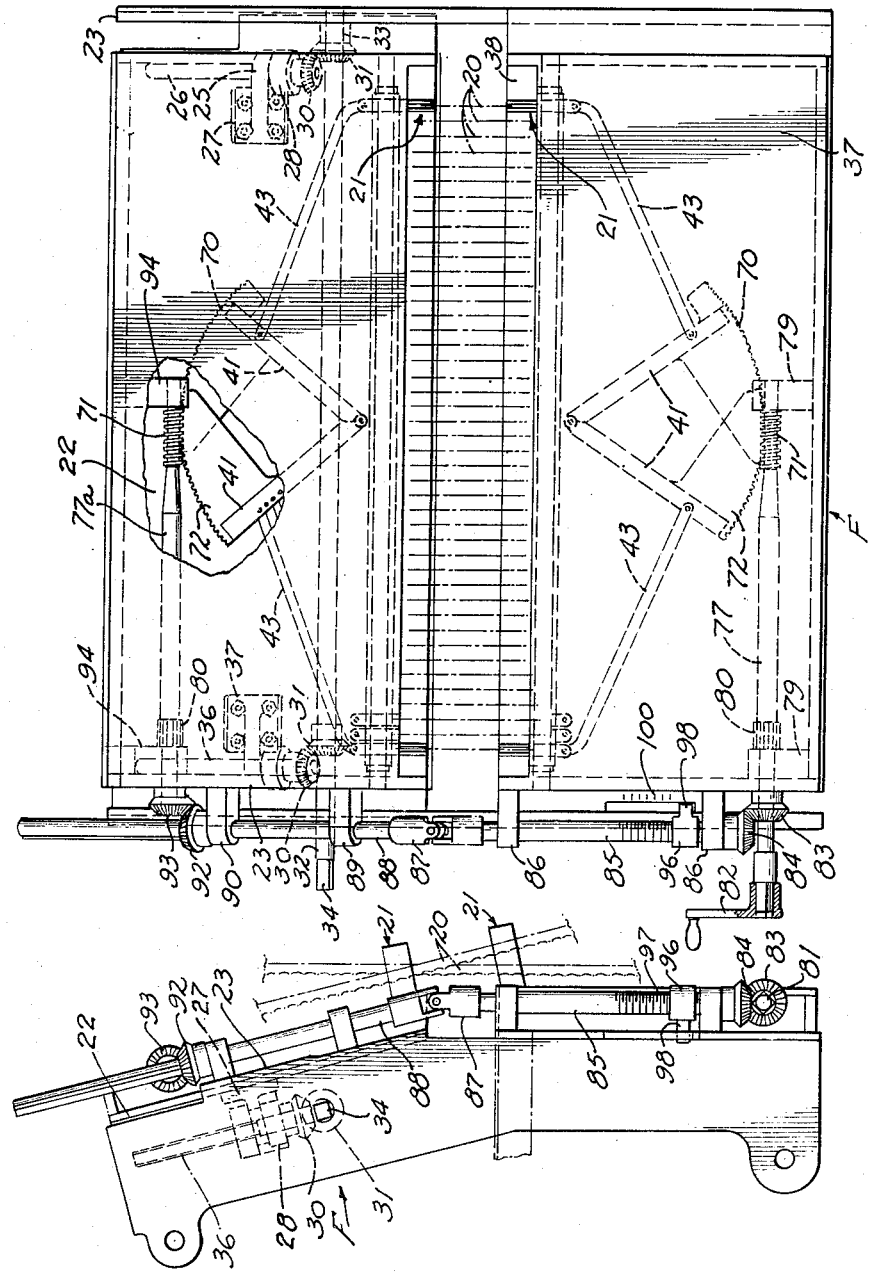
INVENTOR.
WILLIAM W. HARTMAN
BY
ATTORNEY.

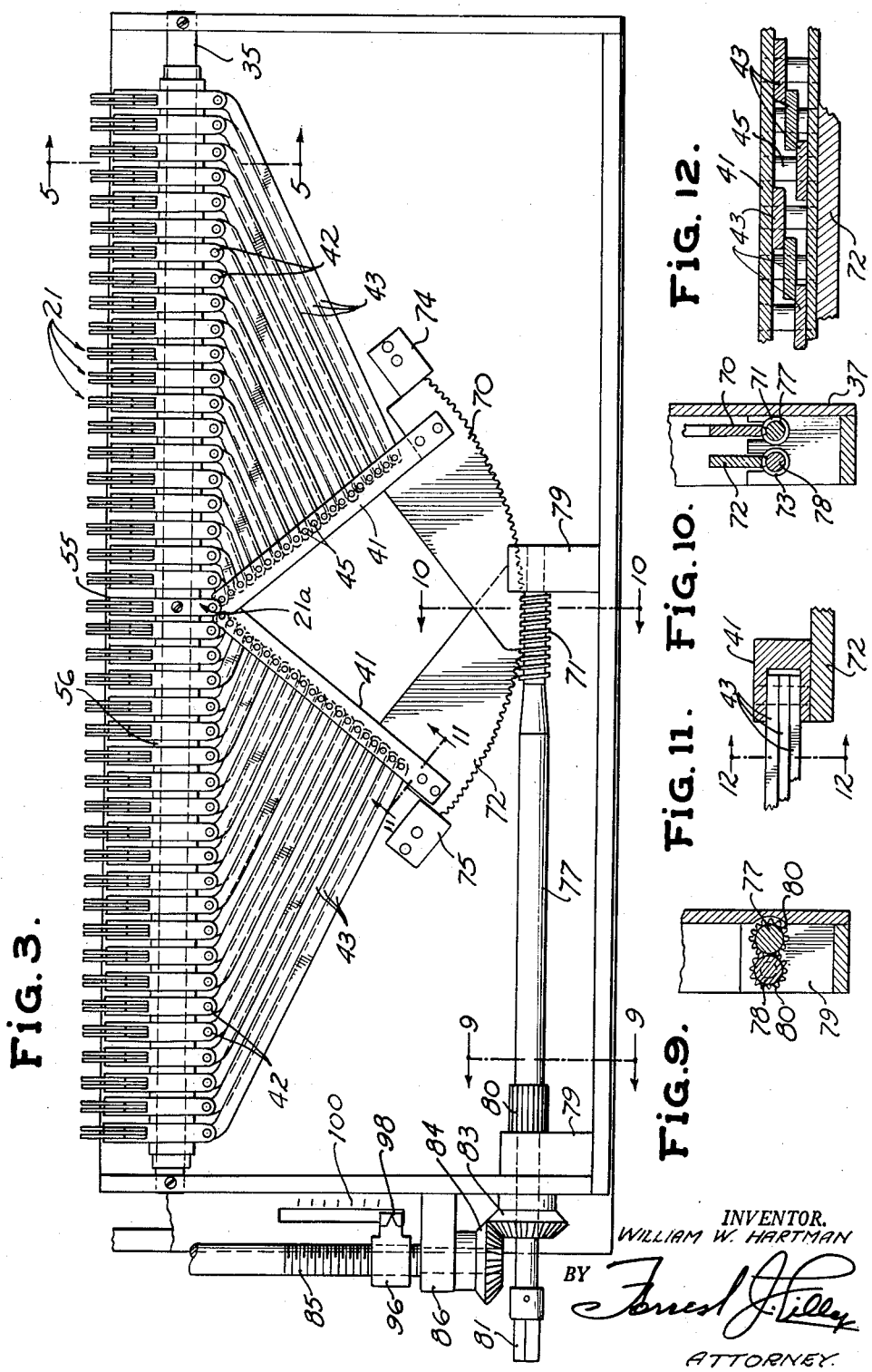

Dec. 7, 1954    W. W. HARTMAN    2,696,253
SPACING CONTROL FOR MULTIPLE BAND-TYPE CUTTING ELEMENTS
Filed Jan. 12, 1951    3 Sheets-Sheet 3
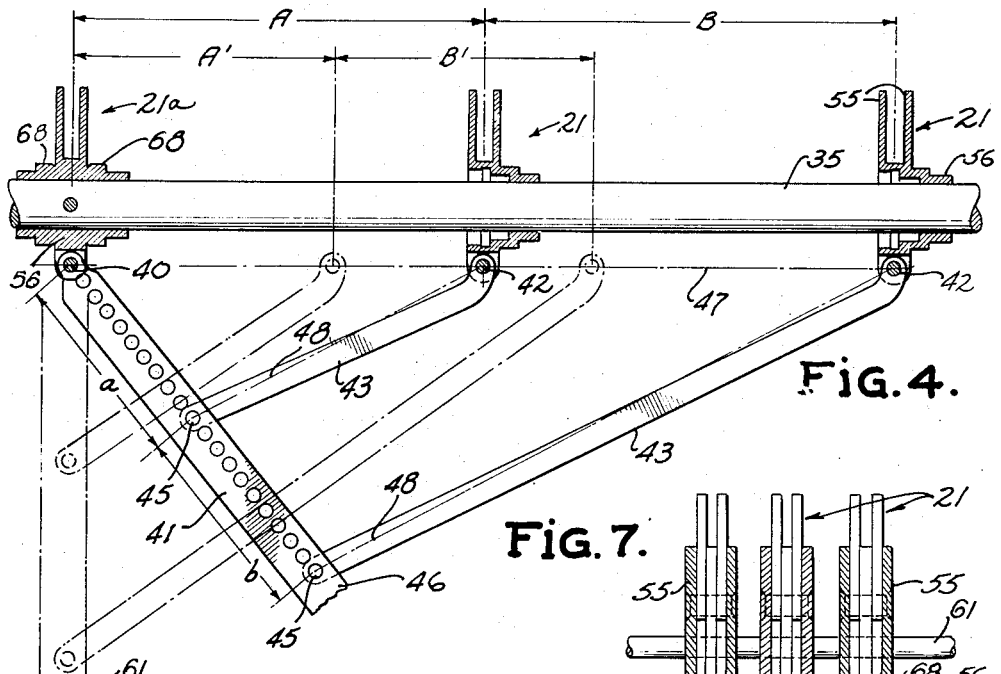
Fig. 4.
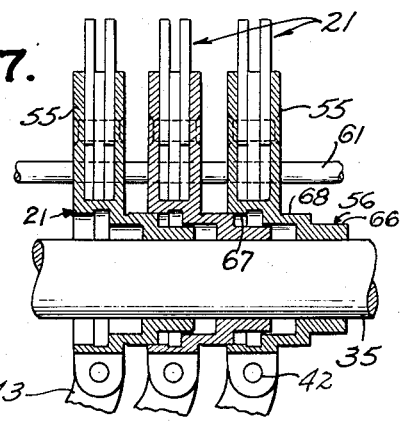
Fig. 7.
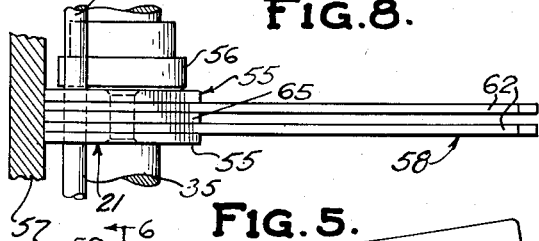
Fig. 8.
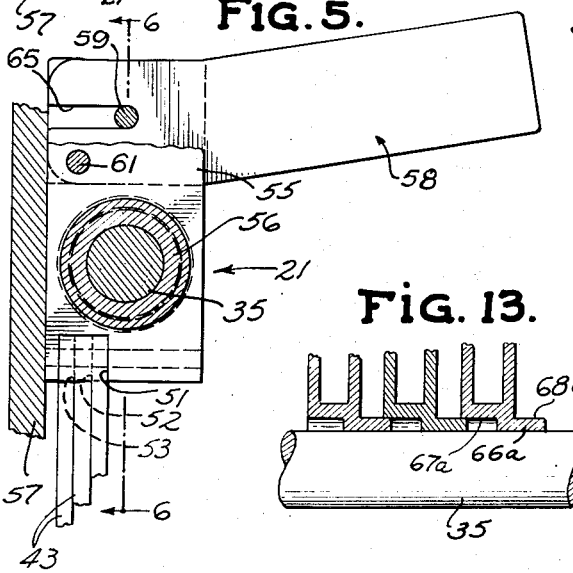
Fig. 5.
Fig. 13.
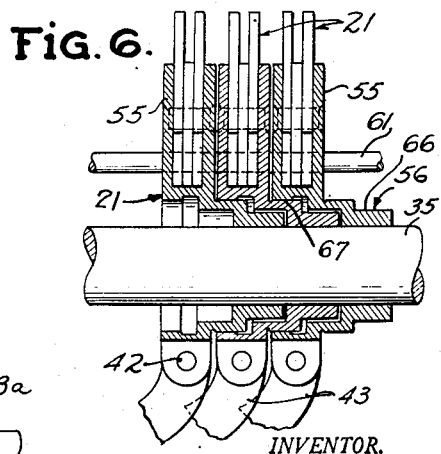
Fig. 6.
INVENTOR.
WILLIAM W. HARTMAN
BY
ATTORNEY.

United States Patent Office 2,696,253
Patented Dec. 7, 1954

2,696,253

SPACING CONTROL FOR MULTIPLE BAND-TYPE CUTTING ELEMENTS

William W. Hartman, Los Angeles, Calif.

Application January 12, 1951, Serial No. 205,759

3 Claims. (Cl. 164—47)

This invention relates to adjustment mechanisms for varying the spacing of multiple cutting bands used in high speed multiple cutting or slicing of various materials including products of nature, such as lumber, and pineapples, as well as manufactured products such as plastics, rubber, bread, etc.

In a cutting or slicing machine of the type to which this invention pertains, the cutting elements are either blade elements or saw elements in the form of endless bands that are trained over a system of cylinders or rollers in the manner of a series of belts. In the cutting zone where objects to be sliced are fed to the machine, the endless bands are turned 180 degrees out of a common plane and guided into parallel planes spaced in accord with the desired thickness of the slices.

Suitable guides are required to hold the blades to the predetermined paths, there being usually one guide where each blade enters the cutting zone, and a second guide where the blade leaves the cutting zone. If a guide is moved laterally to vary the thickness of a slice, the traveling band will follow the guide in the same manner that a power belt follows the fork of a belt shifter. Since it is a costly matter to keep such a high production machine idle, all of the guides should be simultaneously adjustable for quick changeover from one slice thickness to another.

The requirements for an ideal adjustable system of guides have been well known in this art for more than twenty years. Since accuracy in spacing is of first importance, it is obvious that the adjustment mechanism must function accurately throughout the range of slice thicknesses and that any selected adjustment must hold in a thoroughly dependable manner until it is deliberately changed. Simplicity and cost of construction are, of course, important considerations. It is also apparent that the adjustment operation should be rapid as well as easy to perform and that any adjustment index employed should be dependable.

It is not easy to meet these requirements, especially so when the minimum slicing thickness in the range of adjustment must be relatively small, say on the order of one-half inch or less. The problem may be appreciated by pointing out some of the difficulties that have arisen in the various attempts made heretofore to develop a thoroughly satisfactory adjustment mechanism of this particular type.

One well known direction of development work involves setting up adjustment forces to act directly from guide to guide. For example, wedge action and screwthreaded expansion action have been employed between adjacent guides to cause a whole series of guides to expand and contract in spacing. It has been found in practice that in this kind of adjustment action there is an inevitable crowding effect in which resistance is added to resistance with consequent accumulated strain across the series and serious accumulation of error in spacing.

Another line of development avoids these particular difficulties by setting up divergent and convergent cam action in a zone remote from the series of guides and transmitting this action to the individual guides independently. Since all spacing adjustments are derived from a single cam member, for example, a single member with a series of progressively inclined cam grooves, the crowding of element against element is avoided and no accumulation of error can occur. New difficulties enter, however, in the transmission of the adjustment forces from the zone of cam action to the individual guides. If, for example, a follower in each inclined cam groove controls a lever of the third class, which, in turn, controls a remote guide, there are at least three points where lost motion may develop, namely, the pivot point of the lever, the point of connection with the follower, and the outer point of connection with the remote guide. Any lost motion that develops at either of the first two points will naturally have a magnified result at the third or outer point. Ruggedness of construction to avoid such lost motion is precluded by the necessity for small dimensions in width imposed by the close order of the guides at minimum spacing adjustment.

The broad object of the present invention is to provide an adjustment mechanism that meets the previously mentioned requirements without introducing such difficulties and sources of errors as mentioned above. In general, the attainment of this broad object is based on three concepts.

The first concept is the use of a spacing control in the form of an arm pivoted to swing through an angle relatively to the alinement of the series of guides, this swinging control being connected by parallel links with the individual guides. Such an arrangement is based on a familiar geometrical principle of proportional division and eliminates any possibility of accumulated error.

The second concept is that of avoiding dimensional limitations by placing the parallel connecting links in different planes with the width dimension of one link overlapping the width dimension of the adjacent link. Preferably the links are distributed in three planes to afford a width of links sufficient to permit a rugged construction with no possibility of appreciable lost motion at the two link connections. It is to be noted, moreover, that simple links transmit motion without the undesirable multiplying effect characteristic of levers.

The third concept is that of mounting the individual guides movably on a support in the form of a rod or bar with the base portions of the guides overlapping or telescoping along the bar in such manner that the base portion of one guide stabilizes the base portion of the adjacent guide by sliding contact therewith. Here again, dimensional limitation arising from the necessity of providing for close minimum spacing of the guides is avoided by employing an overlapping relationship. Thus each guide may have a base with an effective width much greater than the minimum center-to-center spacing of the guides. This novel arrangement makes it possible to use ruggedly constructed guides notwithstanding close spacing of the guides and makes it possible to provide the guides with base portions sufficiently wide for free sliding action along the bar. Naturally, a guide with such a wide base is stable and free from wobble.

The specific objects of my invention, including these three concepts and their application to various adjustment problems of this kind will be understood from the following detailed description taken with the accompanying drawings.

In the drawings, which are to be considered as merely illustrative,

Figure 1 is a front elevation of a preferred embodiment of the invention with a portion of a plate cut away to reveal structural details;

Figure 2 is a side elevation of the same embodiment;

Figure 3 is a front elevation on a larger scale of one of the adjustment assemblies shown in Figure 1;

Figure 4 is a fragmentary view on a still larger scale showing selected elements in Figure 3;

Figure 5 is a greatly enlarged section taken as indicated by the line 5—5 in Figure 3 showing one of the guides in side elevation;

Figure 6 is a section taken as indicated by the line 6—6 of Figure 5 showing three of the guides positioned at minimum spacing;

Figure 7 is a similar view showing the three guides spaced farther apart;

Figure 8 is a view looking down on one of the guides as indicated by the arrow 8 in Figure 5;

Figure 9 is a section taken as indicated by the line 9—9 of Figure 3;

Figure 10 is a section taken as indicated by the line 10—10 of Figure 3;

Figure 11 is a section taken as indicated by the line 11—11 of Figure 3;

Figure 12 is a section taken as indicated by the line 12—12 of Figure 11; and

Figure 13 is a fragmentary section similar to Figure 7 showing a modified guide construction that may be employed in practicing the invention.

Figures 1 and 2 show the essential mechanism of this invention mounted in a frame generally designated F. As viewed from the front in Figure 1, the frame is of rectangular configuration, but when viewed from the side as in Figure 2, this particular frame is of angular configuration because the cutting bands 20 cross at a relatively small angle as shown. The cutting bands cross because they are trained over upper and lower cylinders or rollers (not shown) in the same manner that a driving belt 15 often crossed between two pulleys.

The individual guides generally designated 21 that regulate the spacing of the cutting bands 20 are arranged in two rows or banks as best shown in Figure 1, one bank being above the level at which the cutting bands cross each other, and the other bank being below said level. These two banks of guides define what may be termed a cutting zone. The material that is to be sliced is fed to the machine in this central region.

Since the cutting bands 20 should be guided as close as possible to the material being cut, and since the vertical dimensions of the material fed to the machine may vary, it is desirable that the two banks of guides be adjustable with respect to their vertical spacing. For this reason, the upper bank of guides 21 along with its associated adjustment mechanism, is mounted on a base plate 22 that is movable up and down on the frame F.

The base plate 22 may be mounted for adjustment in any suitable manner. In the particular arrangement shown in Figure 1, the base plate 22 is slidingly mounted in grooves provided by a pair of side rails 23 and is adjustably supported on each side by a traveling nut member 25 that rides up and down a worm 26. Each of the nut members 25 is integral with a suitable bracket 27 that is bolted onto the base plate 22 from the rear.

Each of the worms or threaded shafts 26 is mounted in suitable bearing 28 on the frame F and is driven by a bevel gear 30 at its lower end. Each of the two bevel gears 30 on opposite sides of the machine meshes with a complementary bevel gear 31 carried by a horizontal actuating shaft 32. The actuating shaft 32, which is mounted in suitable bearings 33 on the frame F, has a projecting squared end 34 to permit the shaft to be rotated when desired by suitable means such as a wrench or a crank.

*First concept.—Automatic proportionate spacing by pivoted arm*

Since both of the banks of guides 21 and their associated control mechanisms are of substantially identical construction as indicated by the use of similar numerals to indicate similar parts in the drawings, a detailed description of the lower bank will suffice for both.

As best shown in Figure 3 the lower bank of guides 21 comprises a central fixed guide 21a, a series of guides 21 extending to the left from the fixed guide and a second series of guides 21 extending to the right from the fixed guide, all of these guides being mounted on a support in the form of a horizontal rod or bar 35. This support 35 is suitably fixed at both ends to the frame F and, as shown in Figure 1, is positioned behind a fixed plate 37 with the guides 21 extending forward through a horizontally extending window 38 in the plate. All of the guides 21 except the central fixed guide 21a are freely slidable on the support bar 35.

The fixed guide 21a carries a pivot pin 40 which serves as a fulcrum for two spacing controls 41 which may be in the form of two bars as shown. The movable guides 21 are provided with pivot pins 42 for connection to corresponding links 43 which links in turn are connected to corresponding pivot pins 45 on the spacing controls 41. Since the pivot pins 45 on the controls 41 are spaced equally and since the links 43 are all parallel, it is apparent that in accord with a well known principle of geometry the guides 21 are equally spaced at all times, but the distance between the equally spaced guides 21 will vary with the angle of the spacing controls 41 relative to the support bar 35.

By virtue of the foregoing premises it also follows from well known principles of geometry that the increment in length of each successive link over the preceding link, in each of the two series of links, starting with the link nearest the pivot pin 40 of the adjusting lever, or spacing control, 41, and going from there outward across the successive links, is equal throughout all the links in both series of links. In the foregoing sentence the link nearest the pivot pin 40 is included, but only for the purpose of establishing a base from which to measure the increment in length of the second, i. e. the next succeeding link outward either to the right or left as the successive links appear in Fig. 3. As previously remarked, the length of each link is considered to be only the straight line distance between pins 42 and 45 respectively found in the ends of each link, see Fig. 4.

The underlying principle of proportional spacing may be understood by considering Figure 4 in which, for simplicity, all of the guides and their corresponding links have been omitted except the fixed guide 21a and two other guides, namely, the tenth and twentieth guides counting to the right from the fixed guide. It is apparent that the pivot pin 40 on the fixed guide 21a is the vertex of a variable angle, one leg of the angle being a line 46 defined by the pivot pins or connectors 45 on the control 41 and the other leg being a line 47 defined by the pivot pins or connectors 42 on the guides 21. For the purpose of this analysis each link is to be considered as the straight line 48 interconnecting the two corresponding pivot pins 42 and 45.

Here we have parallel lines intersecting the two legs of an angle and since the distance $a$ equals the distance $b$ along the leg 46 the distance A must equal the distance B measured along the leg 47. If the spacing control 41 is swung from the position shown in solid lines in Figure 4 to the position shown in broken lines, the distances A and B will be contracted to the distances A' and B', respectively, with A' always equaling B'.

It is assumed here that equal spacing of the guides will be desired and such is usually the case. It is to be noted, however, that while the parallel links divide the two legs of the angle proportionately at all times, the divisions need not be equal and conceivably may be unequal in some practices of the invention.

*Second concept.—Staggered overlapping links*

As shown in Figures 11 and 12 each spacing control 41 may include in its construction a longitudinal channel member 50 to receive the ends of the links 43, the channel member serving as a convenient means for mounting the pivot pins 45, and being of sufficient dimension across its channel to accommodate three rows of the links. Figure 12 shows how the links 43 may be staggered in the three planes with each link in overlapping relation with the two adjacent links on its opposite sides.

The manner in which the three layers of links 43 are connected to the individual guides 21 is shown in Figures 5 and 6. It will be noted that each of the guides 21 has a slot 51 to receive the corresponding link 43, this slot being in the plane of the link and serving to keep the link in that plane. The dotted lines in Figure 5 show how the slots 52 and 53 of the next two succeeding guides 21 are staggered in accord with the offset position of their corresponding links 43.

It is apparent that the overlapping of the links in three planes makes it possible to use links of the width required for rugged construction. The maximum overlap of the links 43 where their ends are connected to a spacing control 41 occurs when the links are at minimum angle relative to the spacing control and this minimum angle will occur at one extreme or the other, that is to say, either when the guides are at maximum spacing as shown in Figure 3, or when the guides are at minimum spacing. If all the links 43 were in one plane they would have to be narrow enough to avoid interfering with each other at this extreme adjustment. The use of such narrow links would necessarily mean the use of pivot pins 45 of relative small diameter, and the whole construction would tend to be flimsy and prone to wear with unavoidable lost motion destroying accuracy.

*Third concept.—Guides arranged with overlapping spaces*

As best shown in Figures 5–8, each of the guides 21 has a one-piece body formed with two spaced ears 55 and a base portion 56 adapted to slidingly engage the support bar 35. As viewed from the side in Figure 5 the guide body may be rectangular in configuration and to prevent rotation on the cylindrical support bar 35, the guide may be in contact along one edge with a smooth backing plate 57.

The two ears 55 of each guide 21 are adapted to receive a replaceable guide wing unit 58. For this purpose the two ears 55 may be spanned by a cross pin 59 and may be provided with holes 60 to slidingly receive a keeper rod 61. Each of the replaceable wing units 58 comprises two smooth guide wings 62 and an intervening spacer plate 63, these three elements being suitably united into one structure by welding, rivets, or the like. Each of the wing units is formed with a slot 65 to straddle the cross pin 59 and is provided with a hole to receive the keeper rod 61. By virtue of this arrangement, simply withdrawing the keeper rod 61 releases all of the wing units 58 in a row of guides 21 for quick replacement.

The principle of so shaping the guides 21 with reference to their base portions 56 that the guides will telescope together for mutual support with widely spaced support points may be carried out in various ways in various practices of the invention. In the present preferred practice, the base portion 56 of a guide extends to one side of the guide proper and diminishes in two steps in both inside and outside diameter as best shown in Figures 6 and 7. Thus the base portion is extended to one side and is hollowed out from the opposite side to permit the desired telescoping relation.

As viewed in cross-section in Figures 6 and 7 it may be said that each guide 21 has a toe 66 in engagement with the support 35, and a heel 67 that is supported in a sliding manner by the next adjacent guide, the toe 66 being a ring or loop of metal slidingly embracing the support rod 35 and the heel 67 being a loop of metal that slidingly embraces a cylindrical bearing surface 68 of the next adjacent guide. Preferably, but not necessarily, the base portion 56 is cut away or machined inside as shown so that only a relatively narrow heel 67 is in sliding contact with the bearing surface 68. It is important that the bearing surface 68 extend laterally for a distance at least as great as the range of adjustment in guide-to-guide spacing so that it may support the corresponding heel 67 at all times.

With reference to the stability of rigidity of a guide 21, it is to be noted that the effective width of the guide base is the distance between the outer end of the toe 66 at one extreme and the outer end of the heel 67 at the other extreme. Figure 6 shows the guides crowded together at minimum spacing and inspection reveals that this effective base width is more than twice the minimum center-to-center spacing of the guides. The span of this effective base width measured along the support bar 35 may be called the base zone of the guide and it will be noted that when the guides are crowded together, as shown in Figure 6, the base portion of one guide extends into the base zones of the next two guides to one side thereof. I have found that when the base width of a guide is at least as great as the diameter of the support bar 35, the guide will slide easily without any tendency to bind. It will be noted that the base width of a guide is substantially greater than the diameter of support bar 35.

As shown in Figure 4 the fixed guide 21a is not hollowed out, but instead its base portion extends laterally in both directions to provide two bearing surfaces 68 to support the heels of the next adjacent guide on each side. Thus the two series of guides on opposite sides of the fixed guide both telescope inwardly toward the fixed guide.

Figure 13 shows an alternate configuration for the base portion of a guide that may be used in some practices of the invention. Here again a toe 66a directly engages the support 35 and a heel 67a is supported by the next adjacent guide base, but in this instance the bearing surface 68a on which the heel rests is the surface of the toe 66a instead of being the surface of an intermediate portion of the base. This alternate construction also provides an effective base width that is greater than the minimum center-to-center spacing of the guides, but in this instance the base width does not exceed twice the minimum center-to-center spacing and when the guides are crowded together the base of one guide does not extend beyond the base zone of the next adjacent guide.

*Adjustment actuating mechanism*

Any suitable mechanism may be used to actuate the spacing controls 41, but a mechanism that employs screw-thread action is preferred. The particular arrangement shown in the drawings by way of example operates all four of the spacing controls 41 in a simultaneous and synchronous manner.

As shown in Figures 3 and 10, one of the spacing controls 41 for the lower bank of guides 21 is provided with a gear segment 70 in mesh with a worm 71 and the other spacing control 41 is provided with a similar gear segment 72 in mesh with a worm 73, the two gear segments lying in different planes. To prevent placing strain on the links 43 and the guides 21, a stop 74 may be placed in the path of the heel of the gear segment 70 to limit the expansion movement of the two spacing controls 41, and a similar stop 75 may be placed in the path of the toe of the same gear segment to limit the contraction movement of the two spacing controls.

The two worms 71 and 73 are integral parts of two shafts 77 and 78, respectively, that are suitably mounted in bearings 79 and these two shafts are interlocked by two gears 80 for synchronous rotation in opposite directions. Shaft 77 has a squared end 81 extending from one side of the machine for actuation by a crank, such a crank 82 being shown in Figure 1. The pitch of both the worms 71 and 73 is in the same direction, but since the worms always rotate in opposite directions, they cause the gear segments 70 and 72 to move in opposite directions for expansion or contraction of the spacing of the guides 21.

For the purpose of simultaneously controlling the spacing of the upper bank of guides 21 a bevel gear 83 on a shaft 77 meshes with a bevel gear 84 on a shaft 85 that extends upwardly through bearings 86. By means of a universal joint 87 (Figure 1) the shaft 85 drives a second shaft 88 that extends upward through a fixed bearing 89 and a second bearing 90 that is carried by the movable base plate 22. Slidingly keyed to the shaft 88 to follow the up and down movements of the base plate 22 is a bevel gear 92 which meshes with a second bevel gear 93 on the end of a shaft 77a. The shaft 77a, which corresponds to the lower shaft 77, carries a worm 71 like the previously described worm 71, and in similar manner is provided with a gear 80 in mesh with a second gear to drive a second shaft (not shown) corresponding to the previously described shaft 78. Both of these upper shafts are mounted in bearings 94 carried by the movable base plate 22.

For the sake of accuracy as well as speed in changing from one spacing adjustment to another, it is desirable to provide some kind of an index. By way of example, Figures 1 and 2 show an index nut 96 that travels up and down screwthreads 97 on the shaft 85. This index nut 96 carries a pointer 98 with an index mark thereon to be read against a suitable scale 100, the scale being calibrated in terms of thickness of slice made by the cutting bands 20.

The manner in which the described mechanism operates will be readily understood from the foregoing description. Whenever it is necessary to change the width of the cutting zone defined by the two banks of guides 21, it is a simple matter to use a crank or wrench to rotate the shaft 32 for raising and lowering the upper base plate 22. When the base plate moves upward, the bearing 90 carried thereby forces the bevel gear 92 upward along the shaft 88 to which it is keyed, and when the base plate is lowered the bevel gear 93 forces the bevel gear 92 down along the shaft.

To change the spacing of the guides 21, it is merely necessary to turn the crank 82 and it has been found that a mechanism such as described is so easy to operate that it responds readily to a crank having an arm only three inches long. Turning the crank 82 causes the two lower sets of worms 71 and 73 and the two corresponding upper worms to rotate simultaneously to cause both the lower set of spacing controls 41 and the upper set to converge or diverge simultaneously in a synchronous manner. Converging the spacing controls 41 contracts the spacing of the guides 21 in a proportionate manner and vice versa.

The spacing index is in plain sight for guidance in making accurate adjustments.

The described embodiment of the invention illustrating the principles involved will suggest to those skilled in the art various changes and departures from the disclosure that may be made within the spirit and scope of the appended claims.

I claim:

1. In an adjustment mechanism for adjustably spacing a series of cutting bands, the combination of: a supporting shaft extending transversely of the bands, and a series of guides for said bands, said guides comprising bodies and blade guide fingers projecting therefrom, said bodies having opposite side faces facing in directions parallel to said shaft, the opposing faces of adjacent guide bodies being adapted to closely approach one another or to be substantially spaced apart, there being bores in said bodies concentric with and larger in diameter than said shaft extending inwardly into said bodies from one side face thereof, hub portions projecting from the opposite side faces of said bodies concentrically with said shaft, said hub portions having internal bores slidingly fitting said shaft, said hub portions having external cylindric bearing surfaces slidably receivable in said bores in adjacent bodies, and means for positioning said guides at adjustable spacing distances from one another.

2. In an adjustment mechanism for adjustably spacing a series of cutting bands, the combination of: a supporting shaft extending transversely of the bands, and a series of guides for said bands, said guides comprising bodies and blade guide fingers projecting therefrom, said bodies having opposite side faces facing in directions parallel to said shaft, the opposing faces of adjacent guide bodies being adapted to closely approach one another or to be substantially spaced apart, hubs projecting from one side face of said bodies concentrically with said shaft, said hubs having cylindric extremities formed with bores slidably fitting said shaft, and having enlarged cylindric portions inward of said extremities of larger exterior diameter than said extremities and formed with intermediate sized bores of larger diameter than the outside diameter of said extremities, said bodies having outside bores extending into the opposite faces thereof to meet said intermediate sized bores in said enlarged portions of said hubs, said outside bores including bearing surfaces slidably receiving the enlarged cylindric portions of the projecting hubs of adjacent bodies, the intermediate sized bores of said hubs being adapted to receive the extremities of the hubs of adjacent bodies, and means for positioning said guides at adjustable spacing distances from one another.

3. In a spacing control for equally spacing and equally changing the spacing of a plurality of band blades, the combination of: elongated supporting means extending transversely of said blades, a plurality of guides for respectively guiding and determining the transverse positions of said blades, one of said guides being fixed in position, the remainder of said guides being arranged in two series located respectively on opposite sides of said fixed guide and being movably mounted on said transversely extending supporting means, two series of links for respectively moving said two series of movably mounted guides, a plurality of pivotal connectors for pivotally connecting each link respectively with its guide, the pivotal centers of the aforesaid pivotal connectors lying in a line that extends transversely of said blades, two adjusting levers for respectively actuating said two series of links, pivotal mounting means for pivotally mounting both said adjusting levers on a common axis located adjacent said fixed guide and said common axis passing through said line in which the pivotal centers of the aforesaid pivotal connectors lie, a second plurality of pivotal connectors for pivotally connecting said adjusting levers respectively with their links, the center-to-center spacings along each of the two adjusting levers from the center of said pivotal mounting means of the levers to the successive centers of the pivotal connectors that connect the adjusting levers to the links being equal throughout on each adjusting lever, also the increment in length of each successive link over the preceding link in each of said series of links, starting with the link nearest said pivotal mounting means of the adjusting levers and going from there outward, being equal throughout each said series of links, and lever actuating means for simultaneously swinging both said adjusting levers in opposite directions about their said common axis, whereby the respective transverse spaces between all neighboring blades are always equal and are always equally changed when said lever actuating means is actuated.

References Cited in the file of this patent

UNITED STATES PATENTS

| Number | Name | Date |
|---|---|---|
| 2,208,834 | Criner | July 23, 1940 |
| 2,249,213 | Kuban | July 15, 1941 |
| 2,336,050 | Walma | Dec. 7, 1943 |
| 2,524,310 | Criner | Oct. 3, 1950 |